Nov. 19, 1968   M. R. PRATHER   3,411,744
WASHER ASSEMBLY FOR WATER VALVE
Filed Feb. 23, 1966

INVENTOR
MAURICE PRATHER,
BY Yungblut, Melville, Strasser and Foster
ATTORNEYS though its utility is
3,411,744
WASHER ASSEMBLY FOR WATER VALVE
Maurice R. Prather, 8085 Hopper Road, Cincinnati, Ohio 45230
Filed Feb. 23, 1966, Ser. No. 529,548
6 Claims. (Cl. 251—88)

ABSTRACT OF THE DISCLOSURE

A washer assembly comprising an upper and lower part whose surface portions lie contiguous with one another and are rotatable relative thereto.

---

This invention relates to an improved washer assembly, and while a washer assembly produced in accordance with the instant invention may be incorporated in numerous devices wherein a pressure tight connection is required, it will find particular utility in water valves and more specifically in conjunction with typical household water faucets. Consequently, while the utility of the invention is not so limited, it will nonetheless be described in conjunction with a standard water faucet found in most homes.

In the conventional household water faucet, a threaded valve stem is fitted into a hollow housing or valve body which is internally threaded to receive the valve stem, the housing having a valve seat whose shoulder underlies the innermost end of the valve stem which is provided with a seat engaging washer. The usual faucet washer comprises a resilient member, usually formed from relatively hard rubber, which is fixedly secured to the valve stem by means of a set screw, the set screw passing through a center opening in the washer and engaging in an internally threaded bore in the valve stem. A handle element or knob is attached to the opposite end of the stem so that turning of the handle or knob causes the valve stem to move axially in the hollow member so as to bring the washer into contact with the valve seat to interrupt the flow of water through the valve body. As the result of the constant engaging and disengaging of the washer with the valve seat through repeated use of the faucet, the washer will become badly scored as it is rotated relative to the valve seat under increasing pressure as the valve is tightened in the closed position. Such scoring is magnified by the fact that the washer is fixed relative to the valve stem and hence rotates relative to the valve seat. The useful life of the washer is necessarily limited, eventually leading to irritating leaks which require replacement of the washer.

In contrast to the foregoing, the instant invention contemplates the provision of a washer assembly wherein the seat contacting portion of the assembly is rotatable relative to the valve stem and hence will not rotate relative to the valve seat upon sealing contact therewith.

Accordingly a principal object of the instant invention is the provision of a washer assembly composed of two parts capable of being rotated relative to each other the first of said parts being in the nature of a mounting member adapted to be fixedly secured to the valve stem, the other comprising a washer element engageable with the valve seat. With such construction, the washer element and the valve stem are free to rotate relative to each other, and consequently when the washer element contacts the valve seat upon closing movement of the valve stem, the valve seat will frictionally engage the washer element and hold it against continued rotational movement with the valve stem.

A further object of the instant invention is the provision of a two part washer assembly in which the parts are preferably molded from a lubric plastic material, such as polyethylene, so that they may be readily rotated relative to each other. At the same time, such plastic materials are not subject to corrosion and hence remain operative over a long period of time.

Still a further object of the instant invention is the provision of a washer assembly wherein one of the parts is provided with an integral neck portion of a size to be readily received in the threaded bore of a conventional valve stem, thereby eliminating the need for a bolt or other attachment means to secure the washer assembly to the valve stem.

Yet a further object of the instant invention is the provision of a valve assembly of the character described wherein the parts of such assembly may be readily assembled, the washer part being provided with an elongated stem of a size to project freely upwardly through a center bore in the other part, whereupon the free end of the stem is adapted to be flattened or otherwise expanded so as to effectively secure the parts together.

The foregoing together with other objects of the invention which will appear hereinafter, or which will be apparent to the skilled worker in the art, are accomplished by that construction and arrangement of parts of which an exemplary shall now be described, reference being made to the accompanying drawings wherein.

Figure 1:
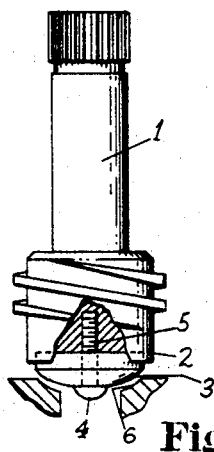
FIGURE 1 is a side elevational view with parts broken away of a conventional valve stem equipped with a conventional washer.

Turning now to a more detailed description of the invention, FIGURE 1 illustrates a conventional water faucet valve stem 1 having an annular collar 2 at its lowermost or inner end which receives a washer 3 secured in place by a set screw 4 which extends through a center opening in the washer where it engages a threaded bore 5 in the body of valve stem 1. With such construction, the washer is fixedly secured to the valve stem and hence is rotatable therewith. Thus, when the valve is closed the washer 3 will be brought into contact with the valve seat 6, and should turning movement continue, the washer will rotate relative to the valve seat and will be scored as the axial force exerted by the valve stem will be increased as such turning movement continues.

Figure 2:
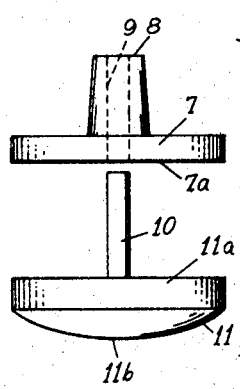
FIGURE 2 is a side elevational view of a washer assembly in accordance with the instant invention, the parts being shown in exploded relation.

In contrast to the foregoing, the conventional washer is replaced with the two part washer assembly shown in FIGURE 2. Preferably, each of the parts will be molded from a plastic material, such as polyethylene, although other resilient and lubric materials may be employed. The upper or mounting member comprises a flat circular or disc like body 7 having a substantially planar lower surface 7a, the body of the upper part being of a size to be received within the collar 2 of the valve stem with the projecting neck 8 wedged upwardly into the threaded bore 5. Preferably, the neck 8 will be of slightly conical configuration so that it may be readily forced into the threaded bore 5 wherein it will enter into biting engagement with the threads of the bore. Alternatively, the exterior surface of the neck portion could be threaded; but for most purposes this is unnecessary.

A centrally disposed passageway 9 extends completely through the body 7 and neck portion 8 and is of a diameter such that it will freely receive the stem 10 of the lower part of the assembly which has a washer portion 11 terminating upwardly in a substantially planar surface 11a surrounding the stem 10 and of a size to mate with the surface 7a of the upper part. The surface 11b will be configured to seat against the conventional valve seat in a faucet.

Figure 3:
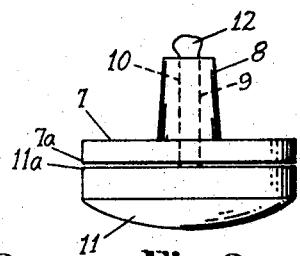
FIGURE 3 is a side elevational view similar to FIGURE 2 but with the parts in assembled relation.

FIGURE 3 shows the two parts in pre-assembled relationship, this being the condition in which the parts will be supplied to the user. It will be noted that the stem 10 extends freely upwardly through the passageway with its uppermost end projecting therebeyond; and the free end of the stem is preferably flattened, as indicated at 12 so that the two parts are effectively secured together. Where the stem 10 is formed from a plastic material, such flattening may be readily accomplished by pinching the free end of the stem subsequent to the assembly of the parts using a heated tool. Since the stem 10 freely fits within the passageway 9, the lower member is free to rotate relative to the upper member; and consequently when the washer assembly is in use and the valve stem closed, the washer portion 11b will contact the valve seat 6 and any subsequent rotative movement of the valve stem will simply cause relative rotation between the upper and lower parts, specifically the under surface 7a of the upper part turning relative to the upper surface 11a of the lower part.

Figure 4:
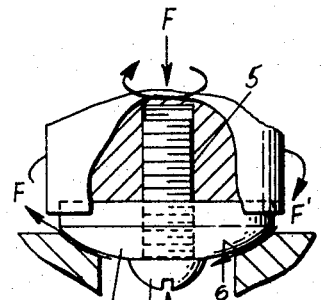
FIGURE 4 is an enlarged fragmentary side elevational view with parts in section illustrating the scoring of a conventional faucet washer when in use.
Figure 5:
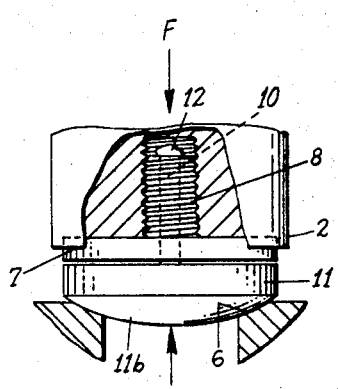
FIGURE 5 is a view similar to FIGURE 4 but illustrating the washer assembly of the instant invention in use.

FIGURES 4 and 5 are illustrative of the forces applied during the closing of a valve equipped with a conventional washer (FIGURE 4) and a like valve equipped with the washer assembly of the instant invention (FIGURE 5). In FIGURE 4, rotation of the valve stem in the direction to close the valve results in compression forces, indicated by the arrows F, urging the valve stem and valve seat toward one another; a second and ultimately damaging force is created between the fixed washer and the fixed valve seat, such force being a rotational force acting at the respective contacting surfaces of the washer and valve seat, indicated by the arrows F'. As opposed to the foregoing, and as illustrated in FIGURE 5, the only significant forces found in a faucet utilizing the washer assembly of the instant invention comprises the compressive forces, again indicated by the arrows F. While there will be a torsional force created between the contacting surfaces 7a and 11a, such force is minimized by forming the contacting surfaces from a material which is inherently lubric, such as the aforementioned polyethylene, thereby materially decreasing the frictional drag between the parts. In any event, scoring between the valve seat contacting surface 11b is effectively minimized and washers constructed in accordance with the instant invention have exhibited a materially enhanced useful life as compared to conventional washer constructions.

Modifications may be made in the invention without departing from its spirit and purpose. For example, while a preference has been expressed for forming both parts of the washer assembly from the same plastic material, it will be evident that different materials could be employed. Similarly, while face to face contact is contemplated between the planar surfaces of the upper and lower parts, one or more washer elements could be inserted intermediate the assembled upper and lower members, if so desired. Consequently, it is not intended that the invention be limited in any manner other than as set forth in the claims which follow.

The embodiments of the invention in which an exclusive property or privilege is claimed is defined as follows:

1. A washer assembly comprising an upper part and a lower part rotatable with respect to one another, said upper part having a circular body portion with an essentially planar lower surface defining said portion's lowermost extent, a centrally disposed neck portion projecting upwardly from and unitary with the said circular body, and a centrally disposed bore extending through said circular body and said neck portion, said lower part comprising a washer body having an essentially planar upper surface of a size substantially equal to and mating with the lowermost planar surface of said upper part, and an elongated stem projecting upwardly from said lower part centrally thereof, said stem being of a size to be freely received in the bore in said upper part, and means operatively connecting said two parts together for rotation relative to each other when said stem is received in said bore and the planar surfaces of said parts are in mating relationship.

2. The washer assembly claimed in claim 1 wherein each of said parts is formed from a plastic material, such as polyethylene.

3. The washer assembly claimed in claim 2 wherein said neck portion is of tapered configuration, being larger at its base end than at its opposite end.

4. The washer assembly claimed in claim 2 wherein said stem is of a length to extend completely through said neck portion with the free end thereof projecting beyond said neck portion, and wherein the means for connecting the parts together comprises a flattened portion on the free end of said stem.

5. For use with a valve stem for a water faucet wherein said valve stem is provided at one end with a washer receiving surface having a centrally disposed inwardly projecting threaded bore, a washer assembly consisting of inner and outer parts rotatable with respect to one another, said inner part comprising a circular body of a size to be juxtaposed to the end of said valve stem, said circular body having a centrally disposed upwardly projecting neck unitary with said body and of a size to be tightly received in said threaded bore, said circular body also having an essentially planar lowermost surface, and a centrally disposed bore extending through said circular body and said neck portion, said lower part comprising a washer body having an essentially planar upper surface adapted to mate with the lowermost surface of said upper part, said upper surface being substantially equal in size to said lowermost surface, a centrally disposed stem projecting upwardly from the said planar surface of said lower part, said stem being of a size to be freely received in the bore in said upper part, and means operatively connecting said upper and lower parts for rotation relative to each other when said stem is received in said bore and the planar surfaces of said parts are in mating relationship.

6. The combination claimed in claim 5 wherein said parts are formed of a plastic material, wherein said stem is of a length to extend completely through the bore in said upper part and project freely therebeyond, and wherein the means for connecting said parts together comprises a flattened portion on the free end of said stem.

References Cited

UNITED STATES PATENTS

| | | | |
|---|---|---|---|
| 359,246 | 3/1887 | England | 251—88 |
| 2,057,233 | 10/1936 | Esnard | 251—88 |
| 2,081,616 | 5/1937 | Diamond | 251—88 |
| 2,277,251 | 3/1942 | Palmer | 251—88 |
| 3,053,502 | 9/1962 | Brooks | 251—88 X |
| 3,103,340 | 9/1963 | Cope | 251—88 |
| 3,275,287 | 9/1966 | Bartlett | 251—88 |
| 2,194,961 | 3/1940 | Walker | 251—357 X |

FOREIGN PATENTS

| | | |
|---|---|---|
| 1,205,672 | 8/1959 | France. |
| 25,749 | 9/1909 | Great Britain. |

M. CARY NELSON, *Primary Examiner.*

ROBERT C. MILLER, *Assistant Examiner.*